United States Patent [19]

Strand

[11] Patent Number: 4,675,759
[45] Date of Patent: Jun. 23, 1987

[54] METHOD AND ARRANGEMENT FOR CONTROLLING THE MOTION OF A MAGNETIC HEAD IN A MAGNETIC TAPE RECORDER

[75] Inventor: Steinar Strand, Langhus, Norway
[73] Assignee: Tandberg Data A/S, Oslo, Norway
[21] Appl. No.: 699,952
[22] Filed: Feb. 8, 1985
[51] Int. Cl.$^4$ .................. G11B 5/52; G11B 21/02
[52] U.S. Cl. .................................. 360/75; 360/78; 360/106
[58] Field of Search .............. 360/69, 75, 128, 137, 360/78, 106, 74.1, 90, 93; 364/550–552

[56] References Cited

U.S. PATENT DOCUMENTS

| | | | |
|---|---|---|---|
| 4,210,940 | 7/1980 | Prysby et al. | 360/72.3 |
| 4,313,141 | 1/1982 | Yanagida et al. | 360/78 |
| 4,445,188 | 4/1984 | Barrett | 360/75 |
| 4,476,503 | 10/1984 | Solhjell 1 | 360/75 |

Primary Examiner—Raymond F. Cardillo
Assistant Examiner—Steven R. Garland
Attorney, Agent, or Firm—Hill, Van Santen, Steadman & Simpson

[57] ABSTRACT

In a system for controlling the motion of a magnetic head in a magnetic tape recorder, in order to achieve an optimally uniform wear of the magnetic head at a side thereof facing the magnetic tape, the magnetic head is constantly moved back and forth during a movement of the magnetic tape during at least one of the modes fast forward and rewind. In magnetic tape recorders wherein the magnetic head is positionable to various tracks of the magnetic tape transversely relative to the moving direction of the magnetic tape, wear on the head can occur at least partially during fast fast forward and rewinding modes. By moving the head during fast forward or rewind, the magnetic head is less heavily worn and the edges of the magnetic tape are not damaged by undesirable depressions in the head.

8 Claims, 3 Drawing Figures

METHOD AND ARRANGEMENT FOR CONTROLLING THE MOTION OF A MAGNETIC HEAD IN A MAGNETIC TAPE RECORDER

BACKGROUND OF THE INVENTION

The invention relates to a method for controlling the motion of a magnetic head in a magnetic tape recorder wherein data are recorded on various tracks of a magnetic tape by the magnetic head. The magnetic head is transversely movable relative to a movement direction of the magnetic tape through use of a positioning device. Signals are generated to control the positioning device so that it will position the magnetic head to the various tracks during recording and playback.

Cassette magnetic tape recorders are already universally known wherein the recording of data onto a plurality of parallel tracks occurs on a magnetic tape provided in a cassette. A magnetic head which is wider than the magnetic tape and which is generally provided with an erase head and a plurality of magnetic head elements such as recording and playback heads is disposed in a transverse direction relative to the magnetic tape by means of a positioning device such that a specific magnetic head element is allocated to a specific magnetic track. A control unit which generates signals for the positioning device for the motion of the magnetic head in a transverse direction relative to the magnetic tape is provided in the magnetic tape recorder. Corresponding control signals are in turn supplied by a magnetic tape controller to the control unit.

For recording or playing back data, the magnetic head assumes different positions allocated to the respective tracks. When only a relatively small dataset is then respectively stored on the magnetic tape, moving the magnetic head is often not required since, given for example a magnetic head having only one magnetic head element, i.e. one write and read head, only the track allocated to this magnetic head element is respectively employed. The analogous case applies given magnetic heads having, for example, two magnetic head elements, i.e. two write and read heads. As a result of always employing only those tracks allocated to the magnetic head elements in the initial position of the magnetic head, the magnetic head is not moved during the recording or playback of data, so that a trough-like depression corresponding to the position of the magnetic head relative to the magnetic tape arises at a front side of the magnetic head which faces the magnetic tape. Also contributing to the depression is the fact that, given movement without recording or playback of data, for example given rewinding or fact forward operations, the magnetic tape is not lifted off from the magnetic head but contacts the magnetic head at the same location. The consequence of this is that the magnetic head is heavily worn at the corresponding location and can thus become unusable relatively quickly. Furthermore, there is also the risk that the front side of the magnetic head will become uneven as a consequence of employing materials having differing hardness at the front side. Also, the depression results in the fact that, should the magnetic head occasionally be moved, the magnetic tape no longer contacts the magnetic head at all locations, and thus faulty recordings or playbacks can occur and the edges of the magnetic tape can be damaged.

SUMMARY OF THE INVENTION

It is therefore an object of the invention to specify a method and an arrangement given employment whereof the magnetic head is worn as uniformly as possible.

Given a method of the type initially described, this object is achieved by alternately moving the magnetic head back and forth in both directions transversely relative to a moving direction of the magnetic tape. This back and forth movement is accomplished when the magnetic tape is not recording or playing back data.

The method of the invention has the advantage that, on the one hand, those locations at the front side of the magnetic head at which the magnetic head elements are disposed are less heavily worn since the wear is distributed over a large part of the front side of the magnetic head. Damage to the edges of the magnetic tape is avoided when the magnetic head is thus positioned. It is also assured that no trough-like depressions are formed at the front side of the magnetic head due to the method of the invention since the magnetic tape always completely presses against the magnetic head and faulty recordings or playbacks are thus avoided. Finally, unevenness at a front side of the magnetic head as a consequence of differing hardness of the material employed is also avoided by the method of the invention.

The motion of the magnetic head in a transverse direction relative to the magnetic tape preferably occurs such that the magnetic head executes a triangular or sinusoidal motion on the magnetic tape. It is also possible to execute a sawtooth motion or to select individual tracks in accordance with their defined sequence. Finally, it is also possible to execute the motion of the magnetic head in a transverse direction of the magnetic tape continuously or in steps independently of the tracks.

The constant back and forth motion of the magnetic head occurs particularly when a rewinding operation is executed in a forward direction (fast forward) and/or a reverse direction. It is also possible to execute the motion of the magnetic head when a movement of the magnetic tape occurs only over a portion of its length and no recording or playback operation is executed at the same time. Should the erase head have an adequate width, the constant motion of the magnetic head can also be executed during the erase operation. Preferably, however, the erase operation is handled in the same fashion as a recording or a playback operation, so that no motion of the magnetic head then occurs.

An arrangement for the implementation of the invention is preferably designed such that means are provided in the control unit, said means emitting signals to the positioning device during the movement of the magnetic tape when recording or playback operations are not simultaneously executed, these signals effecting the alternating motion of the magnetic head. For this purpose, a counter which is connected to a clock generator and which is alternately incrementally and decrementally counted is preferably provided in the control unit. The signals emitted by the counter are, for example, emitted via a read-only memory as positioning signals and the magnetic head is respectively displaced by the positioning device such that its actual position coincides with the rated position output from the read-only memory. The values stored in the read-only memory can thus be formed such that the magnetic head executes a triangular or sinusoidal motion on the magnetic tape in accordance with the incrementation and deincrementation of the counter.

In one embodiment of the invention, the means are formed in common with the control unit by a correspondingly programmed microcomputer.

DESCRIPTION OF THE PREFERRED EMBODIMENTS

Figure 1:
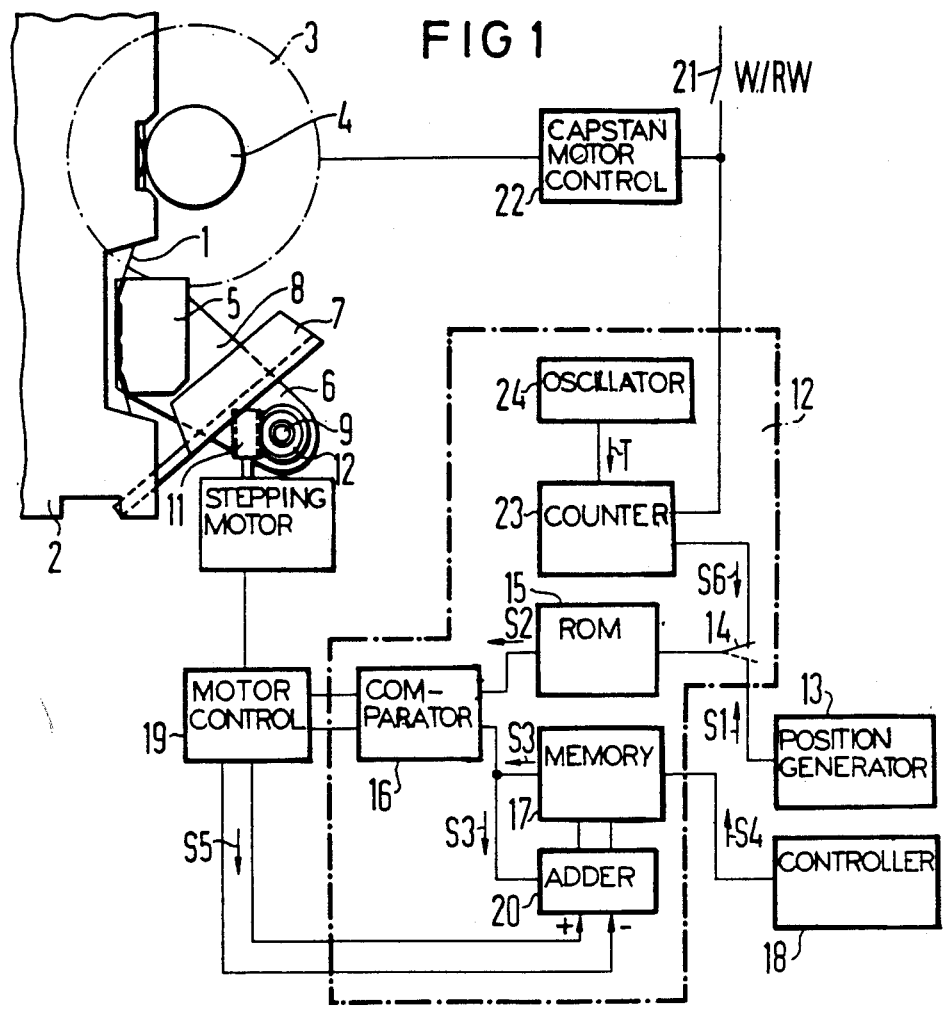
FIG. 1 is a block diagram of a system for implementation of the method of the invention.

The block diagram shown in FIG. 1 illustrates a portion of a magnetic tape recorder such as disclosed in, for example, U.S. application Ser. No. 555,151, incorporated herein by reference. A magnetic tape 1 is movable between two reels in a partially shown cassette 2. The drive of the magnetic tape 1 occurs by use of a capstan motor which drives a capstan 4. The magnetic tape 1 can be driven by means of the capstan 4 in normal operation with a normal speed given a recording, playback, or erase operation. In addition, it can also be moved with an elevated tape speed, for example during a rewinding or fast forward operation.

Recording, playback and erasing data on the magnetic tape occur upon employment of a magnetic head 5 which is secured to a positioning means 6. Upon insertion of the cassette 2 into the magnetic tape recorder, a cover 7 of the cassette 2 is opened and the magnetic head 5 is brought into contact with the magnetic tape 1. Given the cassette tape recorder illustrated, the magnetic head 5, which is secured to a carrier 8, is pivoted in around an axle 9 behind the cover 7 for this purpose. The magnetic head 5 is movable in a transverse direction relative to the magnetic tape 1 in common with the carrier 8. For this purpose, a motor 10, preferably a stepping motor, is provided, a worm 11 being secured to the shaft thereof. A corresponding worm wheel 12 having an inside thread is disposed around the axle 9. An outside thread is provided at the axle 9 in the region of the worm wheel 12, said outside thread cooperating with the inside thread of the worm wheel 12. Given a rotation of the worm 11, the worm wheel 12 is moved in a longitudinal direction of the axle 9. The carrier 8 lies against the worm wheel 12 and is moved simultaneously therewith, so that the magnetic head 5 is movable in a transverse direction of the magnetic tape 1 by means of the motor 10. Such a positioning device is disclosed, for example, in U.S. application Ser. No. 555,152, now U.S. Pat. No. 4,609,959 incorporated herein by reference. Further positioning devices may be derived from the U.S. application Ser. No. 363,438 now U.S. Pat. No. 4,491,890 or from the U.S. Letters Patent 4,313,141 both incorporated herein by reference.

The magnetic tape 1 is written in serpentine fashion in a plurality of parallel tracks. For example, the data are recorded onto the magnetic tape 1 in four tracks. The magnetic head 5 can contain one or two magnetic head elements, whereby a write head and a read head are to be respectively understood as a magnetic head element. In case, for example, the magnetic head 5 contains two magnetic head elements, a track "0" is written by the first magnetic head element and a track "1" is written by the second magnetic head element. When, in this case, a change is undertaken from track "0" to track "1", no motion of the magnetic head 5 in a transverse direction relative to the magnetic tape 1 is required. For writing the tracks 3 and 4, the magnetic head 5, however, is moved a prescribed distance in a transverse direction of the magnetic tape 1, so that the respective magnetic head element can be employed for writing the respective "2" track, and the other magnetic head element can be employed for writing the "3" track. The analogous case applies for reading data from the magnetic tape 1. Given more tracks on the magnetic tape 1, a corresponding number of further movements of the magnetic head 5 would have to be executed, whereby the number of movements is again reduced when more than two magnetic head elements are provided in the magnetic head 5.

The positioning of the magnetic head 5 to the various tracks occurs by employment of a control unit 100 which is preferably designed as a microcomputer but which can also be constructed of individual integrated circuits. A control unit 100 for positioning a magnetic head 5 to various tracks of the magnetic tape 1 is already notoriously known and can be derived from, for example, U.S. Letters Patent 4,313,141, incorporated herein by reference.

The control unit 100 receives signals S1 from a position generator 13 which, for example, is a known prior art component of a magnetic tape controller, said signals specifying that track to which a magnetic head element is to be positioned. Via a switch 14 which is situated in the position indicated with broken lines during recording and playback, the signals S1 proceed to a read-only memory 15 which emits binary coded signals S2 to a comparator 16, said signals S2 being allocated to the signals S1. The signals S2 represent the rated or standard position and the comparator compares the signals S2 to signals S3 which indicate the actual position and which are stored in a memory 17. A controller 18 specifies a reference position by means of signals S4, said reference position, for example, being allocated to one edge of the magnetic tape 1. Such a controller 18 may be derived, for example, from U.S. Letters Patent 4,476,503, incorporated herein by reference. It is also possible to define the reference position by a light barrier which may be derived, for example, from U.S. Letters Patent 4,313,141, incorporated herein by reference.

Dependent on the difference between the signals S2 and S3, the comparator 16 emits signals to a motor control 19 for the stepping motor 10, the motor 10 being controlled in the one or in the other rotational sense with these signals. Simultaneously, corresponding signals S5 are input into the memory 17 via an adder 20 which combines these signals S5 with signals S3, these signals S3 being respectively input in order to be able to specify the respective actual position. Given equality of the signals S2 and S3, the comparator 16 outputs no further signals, since the magnetic head 5 has been set to the desired track and the rated position coincides with the actual position.

The detailed function of the circuit arrangement including memory 17 and adder 20 is disclosed in the U.S. Letters Patent 4,313,141, incorporated herein by reference. The motor control 19 corresponds to the actuator driver 56 in FIG. 2 thereof. The adder 20 and the memory 17 correspond to the present position memory 46 therein. The respective actual position of the magnetic head is stored in the memory 17 whereas the respective rated position is stored in the memory 15. The comparator 16 determines the difference between the signals S2 and S3 and emits signals to the motor control 19 which effect a forward or a reverse rotation of the motor 10. Corresponding signals S5 are supplied to the adder 20 which combines signals S3 identifying the prior actual position with the signals S5 and writes the result into the memory 17 as the new actual position. The adder 20 is a standard adder which subtracts a plurality of signals corresponding to the signals S5 from the value represented by the signals S3 or adds a plurality of signals corresponding to the signals S5 to the value represented by the signals S3. It can also be designed as a counter which is set to the value specified by the signals S3 and which is incremented or deincremented with every pulse S5.

Given a movement of the magnetic tape 1 without simultaneous recording or playback of data, for example during a rewinding operation, a switch 21 is closed and corresponding signals which, for example, cause an elevated tape speed of the magnetic tape 1, are forwarded to the capstan motor 3 via a motor control 22. At the same time, the switch 14 is brought into the position indicated with solid lines. Furthermore, a counter which is designed as an incrementer/deincrementer is enabled. The counter 23 is constantly alternately incremented and deincremented by means of clock pulses T generated in an oscillator 24. The signals S6 which are supplied via the switch 14 to the read-only memory 15 are allocated to the counter readings. The read-only memory 15 now emits signals S2 that are formed such that the magnetic head 5 moves back and forth either triangularly or sinusoidally over the magnetic tape 1 during the movement of the magnetic tape 1. It is also possible to form the signals S2 such that the magnetic head 5 executes a sawtooth or a random motion on the magnetic tape 1. The frequent back and forth motion of the magnetic head in a transverse direction of the magnetic tape 1 prevents the formation of a depression in the magnetic head 5 and prevents the magnetic head 5 from wearing particularly heavily in this region.

Figure 2:
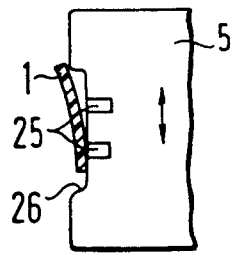
FIG. 2 is a schematic illustration of a plan view of a magnetic head element.

Given the illustration in FIG. 2, a magnetic head 5 is shown which comprises two magnetic head elements 25 which are allocated, for example, to the tracks "0" and "1" on the magnetic tape 1. When only a relatively small dataset is respectively stored on the magnetic tape 1, then the data are recorded only on the tracks "0" and, under given conditions, on the track "1" as well. No positioning motion of the magnetic head 5 is required for this purpose, so that the same region at the front side of the magnetic head 5 is always in contact with the magnetic tape 1. The consequence thereof is that this region is especially heavily worn, whereby a trough-like depression 26 can form. Thus the magnetic head elements 25 are very heavily worn in this region. When the magnetic head elements 25 and the remaining parts at the front side of the magnetic head 5 have differing hardness, then an uneven surface can also arise within the depression 26. Moreover, as shown in FIG. 2, the edge of the magnetic tape 1 can be damaged when the magnetic head is nonetheless occasionally positioned to different tracks. In this case, the edge of the magnetic tape 1 lies against the edge of the depression 26 and damage to the edge of the magnetic tape 1 can thus arise given motion of the magnetic head 5. Moreover, the overall area of the magnetic tape 1 no longer lies against the magnetic head 5 in this case so that faulty recording operations or playback operations can occur.

Figure 3:
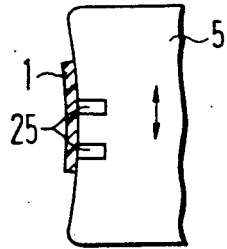
FIG. 3 is a side view of a magnetic head having a depression caused by the magnetic tape.

As shown in the illustration of FIG. 3, the formation of a trough-like depression 26 is avoided when the magnetic head 5 is always moved back and forth across the entire magnetic tape 1 whenever the magnetic tape 1 is moved without a recording or playback of data occurring at the same time. In this case, the front side of the magnetic head is more uniformly worn so that a basin-shaped depression will at most arise. The magnetic head elements 25 are subjected to far less wear and the entire width of the magnetic tape 1 lies against the magnetic head 5, so that fewer faulty recording and playback events occur. Furthermore, damage to the tape edges is avoided since the basin-shaped depression does not have any edges.

Even given recording and playback operations that encompass all tracks of the magnetic tape 1, it proves advantageous when the magnetic head 5 is moved back and forth when, for example rewinding, since the reciprocating motion can be executed such that it exceeds the maximum motion during the recording or playback operations, so that the polishing of the front side of the magnetic head optimally extends over the entire width thereof.

The counter 23 in the control unit 100 is preferably formed by means of a microcomputer in common with said control unit, said microcomputer being programmed in an appropriate fashion. For the purpose of counting, for example, register contents are added so that the signals S2 cause the desired travel in the motion of the magnetic head 5.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for preventing uneven wear on a magnetic head in a magnetic tape recorder having play back capability and which is at least partially caused by magnetic tape rubbing on the magnetic head during a fast forward or rewind mode, comprising the steps of:

during recording and playback, providing a control unit for positioning the magnetic head relative to a desired track selected from a plurality of tracks on the tape; and during at least one of the fast forwarding or rewinding modes of the tape, alternately moving the magnetic head back and forth in directions substantially transverse to a running direction of the magnetic tape by control signals from the control unit so as to prevent formation of a depression in the head during a fast forward or rewind.

2. A method according to claim 1 wherein said magnetic head executes a triangular motion on the moving magnetic tape.

3. A method according to claim 1 wherein said magnetic head executes a sinusoidal motion on the moving magnetic tape.

4. A system for preventing uneven wear on a magnetic head in a magnetic tape recorder having playback capability and which is caused by a magnetic tape in contact with the tap during a fast forwarding or rewinding mode, comprising:

positioning means for moving the magnetic head transversely relative to a running direction of the magnetic tape;

means for sensing when the magnetic tape is moving relative to the magnetic head in at least one of the fast forward or rewind modes; and control means connected to said sensing means for controlling the positioning means so that the magnetic head is moved back and forth in said transverse direction repetitively and automatically without operator intervention so as to provide an even wear of the magnetic head during at least one of the fast forward or rewind modes.

5. A system according to claim 4 wherein said control means includes a counter means connected to an oscillator such that the counter means is alternately incremented and deincremented by clock pulses emitted by the oscillator.

6. A system according to claim 4 wherein said control means includes a microcomputer.

7. A system for preventing wear during a fast forward or rewind mode of a magnetic head which records signals on and senses signals from a magnetic tape, comprising:

positioning means for moving the magnetic head transversely relative to a movement direction of the magnetic tape so as to align the magnetic head with one of a plurality of tracks on the tape during recording or playback;

stepping motor means for controlling the positioning means;

motor control means for controlling the stepping motor means;

control means for establishing a reference signal for movement of the magnetic head relative to the tape;

position generator means for generating signals defining rated positions for the positioning means for alignment with various ones of said plurality of tracks on the magnetic tape during a recording or playback mode; and control unit means which during recording or playback modes provides signals to the motor control means and receives signals from the position generator means and control means so as to position the magnetic head relative to a desired one of said plurality of tracks, and which includes means for sensing when the tape is moving relative to the head in at least one of the fast forward or rewind modes and provides signals to the motor control means for executing a repetitive back and forth motion of the magnetic head automatically so as to prevent uneven head wear during at least one of the fast forward or rewind modes.

8. A method for controlling motion of a magnetic head in a magnetic tape recorder having playback capability and wherein data are recorded on various tracks of a magnetic tape by the magnetic head and data is played back therefrom, said magnetic head being transversely movable relative to a running direction of the tape through use of a positioning device, and wherein a tape drive is provided for moving the magnetic tape, comprising the steps of:

generating signals with a control unit by which the positioning device positions the magnetic head to the various tracks for recording and playback from a given track; and with movement of the magnetic tape in at least one of a fast forward or rewind modes, alternately moving the magnetic head back and forth in both directions transversely relative to a moving direction of the magnetic tape through control signals from the control unit so as to prevent uneven wearing of the head during at least one of the rewind or fast forward modes.

* * * * *